US012116821B2

(12) United States Patent
Yong

(10) Patent No.: US 12,116,821 B2
(45) Date of Patent: Oct. 15, 2024

(54) SIDE DOOR OPENING AND CLOSING APPARATUS FOR AUTOMOBILE

(71) Applicant: KWANGJIN CO., LTD., Asan-si (KR)

(72) Inventor: Kyeong Jung Yong, Asan-si (KR)

(73) Assignee: KWANGJIN CO., LTD., Asan-si (KR)

( * ) Notice: Subject to any disclaimer, the term of this patent is extended or adjusted under 35 U.S.C. 154(b) by 0 days.

(21) Appl. No.: 18/037,014

(22) PCT Filed: Jun. 24, 2021

(86) PCT No.: PCT/KR2021/007970
§ 371 (c)(1),
(2) Date: May 15, 2023

(87) PCT Pub. No.: WO2022/149673
PCT Pub. Date: Jul. 14, 2022

(65) Prior Publication Data

US 2024/0018819 A1 Jan. 18, 2024

(30) Foreign Application Priority Data

Jan. 11, 2021 (KR) ........................ 10-2021-0003572

(51) Int. Cl.
*E05F 15/619* (2015.01)
*E05F 15/41* (2015.01)

(52) U.S. Cl.
CPC ............ *E05F 15/619* (2015.01); *E05F 15/41* (2015.01); *E05Y 2201/21* (2013.01); *E05Y 2400/20* (2013.01); *E05Y 2900/531* (2013.01)

(58) Field of Classification Search
CPC ....... E05F 15/619; E05F 15/63; E05F 15/622; E05F 15/616; E05F 15/627; E05F 15/41;
(Continued)

(56) References Cited

U.S. PATENT DOCUMENTS 4,739,585 A * 4/1988 Pickles .................. B60J 7/0573 49/280
6,142,551 A * 11/2000 Ciavaglia .............. E05F 15/619 49/340
(Continued)

FOREIGN PATENT DOCUMENTS

JP 05-079248 A 3/1993
JP 2000-177391 A 6/2000
(Continued)

*Primary Examiner* — Justin B Rephann
(74) *Attorney, Agent, or Firm* — Bridgeway IP Law Group, PLLC; Jihun Kim

(57) ABSTRACT

An opening and closing device for a side door for a vehicle, which enables a side door of a vehicle to be automatically opened and closed with respect to a vehicle body, includes a housing fixedly provided in the side door and having a receiving space therein, a drive motor located in the receiving space of the housing and including a drive shaft, a worm gear connected to the drive shaft and rotating together with the drive shaft, a worm wheel engaged with the worm gear and rotatable by receiving a rotational force from the worm gear, a pinion gear rotating in conjunction with the worm wheel, and a rack gear having one end hinged to the vehicle body, the rack gear being engaged with the pinion gear to convert rotational motion of the pinion gear into linear motion.

5 Claims, 8 Drawing Sheets

(58) Field of Classification Search
CPC ............. E05Y 2201/21; E05Y 2400/20; E05Y 2900/531
See application file for complete search history.

(56) References Cited

U.S. PATENT DOCUMENTS

| | | | | | |
|---|---|---|---|---|---|
| 6,382,706 | B2 * | 5/2002 | Yuge | E05F 15/619 296/146.4 |
| 6,513,859 | B2 * | 2/2003 | Yuge | E05F 15/619 296/146.4 |
| 6,799,790 | B2 * | 10/2004 | Sakai | E05F 15/619 49/340 |
| 8,366,175 | B2 * | 2/2013 | Schmitt | E05C 17/006 16/86 B |
| 9,234,377 | B2 * | 1/2016 | Schatz | F16H 19/02 |
| 9,995,066 | B1 * | 6/2018 | Ottolini | E05F 15/616 |
| 10,041,281 | B1 * | 8/2018 | Miu | E05C 17/203 |
| 10,612,288 | B2 * | 4/2020 | Rietdijk | F16D 51/00 |
| 10,669,756 | B2 * | 6/2020 | Miu | E05F 15/622 |
| 11,111,713 | B2 * | 9/2021 | Noguchi | E05F 15/619 |
| 11,732,521 | B2 * | 8/2023 | Reddmann | E05F 15/619 49/340 |
| 11,821,254 | B2 * | 11/2023 | Eggert | E05F 15/619 |
| 2003/0141834 | A1 * | 7/2003 | Sakai | E05F 15/619 318/280 |
| 2003/0146644 | A1 * | 8/2003 | Sakai | E05F 15/619 296/146.8 |
| 2003/0221371 | A1 * | 12/2003 | Yokota | E05F 15/63 49/342 |
| 2005/0127711 | A1 * | 6/2005 | Rigorth | E05F 15/63 296/146.4 |
| 2007/0063536 | A1 * | 3/2007 | Okada | E05F 15/619 296/146.4 |
| 2011/0266080 | A1 * | 11/2011 | Schmitt | E05C 17/006 49/358 |
| 2012/0000304 | A1 * | 1/2012 | Hamminga | E05F 15/622 74/89.23 |
| 2018/0258682 | A1 * | 9/2018 | Schatz | E05F 15/614 |
| 2019/0153768 | A1 * | 5/2019 | Termine | E05F 15/622 |
| 2020/0131836 | A1 * | 4/2020 | Ottino | E05F 1/105 |
| 2020/0217122 | A1 * | 7/2020 | Noguchi | E05F 15/63 |
| 2020/0270930 | A1 * | 8/2020 | Reddmann | E05F 15/619 |
| 2020/0355010 | A1 * | 11/2020 | Aceto | E05F 15/611 |
| 2022/0127893 | A1 * | 4/2022 | Eggert | E05F 15/619 |
| 2022/0205286 | A1 * | 6/2022 | Bendel | E05B 81/34 |
| 2023/0304350 | A1 * | 9/2023 | Kaplan | E05F 15/619 |

FOREIGN PATENT DOCUMENTS

| | | | |
|---|---|---|---|
| JP | 2005-083192 | A | 3/2005 |
| KR | 10-1999-0029998 | A | 4/1999 |
| KR | 10-0704451 | B1 | 4/2007 |
| KR | 10-2040051 | B1 | 11/2019 |
| KR | 10-2172999 | B1 | 11/2020 |

* cited by examiner

SIDE DOOR OPENING AND CLOSING APPARATUS FOR AUTOMOBILE

TECHNICAL FIELD

The present disclosure relates to an opening and closing device for a side door for a vehicle, which enables a door of a vehicle to be opened and closed automatically and manually and has a simple structure.

BACKGROUND ART

A side door for a passenger to get on and off is provided on the side of a vehicle, and the side door is configured so that the passenger is able to manually open and close the door.

Recently, structures in which a drive motor is installed on a side door of a vehicle and the door is automatically opened and closed by using power of the drive motor have been applied to vehicles. Korean Patent No. 10-2172999 is known in relation to such an automatic door opening and closing device.

Such an opening and closing device includes a drive motor, a worm gear connected to a drive shaft of the drive motor, and a worm wheel engaged with the worm gear. When the drive motor rotates, the worm gear rotates to rotate the worm wheel, and the door is opened and closed as the worm wheel rotates.

In this case, when a gear ratio of the worm wheel and the worm gear is sufficiently large, a large force may be generated even with small power of the drive motor, and an inclined state of the vehicle may be supported.

That is, due to a difference in gear sizes, the worm wheel may rotate when the worm gear rotates, but the worm gear does not rotate when the worm wheel tries to rotate. Even in a conventional opening and closing device including the worm gear and the worm wheel, a user must be able to manually open the door. Because the worm gear may not rotate even when the worm wheel connected to the door rotates, when trying to manually open and close the door, a clutch device is added to allow only the worm wheel to rotate without the worm wheel being connected to the worm gear. In Korean Patent No. 10-2172999, a friction material, a friction plate, and a pressing means are provided as a clutch device.

However, because such a complex clutch device is added, the overall device is complicated and costs are inevitably high, and because a complex mechanical structure is included, the risk of failure increases.

DISCLOSURE

Technical Problem

The present disclosure is designed to solve the problems of the related art, and therefore the present disclosure is directed to providing an opening and closing device of a side door for a vehicle in which automatic and manual modes may be implemented in a simple structure.

Technical Solution

According to an embodiment of the present disclosure, an opening and closing device for a side door for a vehicle, which enables a side door of a vehicle to be automatically opened and closed with respect to a vehicle body, includes a housing fixedly provided in the side door and having a receiving space therein, a drive motor located in the receiving space of the housing and including a drive shaft, a worm gear connected to the drive shaft and rotating together with the drive shaft, a worm wheel engaged with the worm gear and rotatable by receiving a rotational force from the worm gear, a pinion gear rotating in conjunction with the worm wheel, and a rack gear having one end hinged to the vehicle body, the rack gear being engaged with the pinion gear to convert rotational motion of the pinion gear into linear motion, wherein the worm gear has a reversible structure in which the worm gear is rotatable by receiving a rotational force of the worm wheel when the worm wheel rotates, so that, when the drive motor rotates in an automatic mode, the worm gear rotates the worm wheel, and when a user manually rotates the door in a manual mode, the worm gear is rotatable by the rotating worm wheel.

In the opening and closing device, a lead angle of a thread of the worm gear may range from 5° to 15°.

In the opening and closing device, the drive motor may be connected to one end of the worm gear, and a brake for stopping rotation of the rotating worm gear may be provided at the other end of the worm gear, wherein the brake is configured so that a braking force is removed when an electrical signal is applied to the brake, and a braking force is cut off when an electrical signal is removed from the brake.

The opening and closing device may further include a load sensor configured to detect whether the user manually opens and closes the door, and a control means connected to the load sensor and configured to transmit an electrical signal to the brake when a signal is detected from the load sensor, wherein, when the load sensor detects that the user manually opens and closes the door in the manual mode, the control means connected to the load sensor applies an electrical signal to the brake to remove a braking force.

In the opening and closing device, a concave groove having a shape corresponding to the pinion gear may be formed at a center of the worm wheel, and a part of the pinion gear may be inserted into the concave groove so that the pinion gear rotates in conjunction with the worm wheel, and a gear shaft supporting the pinion gear may be inserted into a center of the pinion gear while being rotationally fixed to the housing.

In the opening and closing device, the worm wheel may include a wheel body with gear teeth formed at an circumferential edge, and a central protrusion protruding from one surface of the wheel body and including a concave groove formed at a center, wherein a central hole is formed in the housing at a position corresponding to the central protrusion, and a sealing ring is fixedly provided at an circumferential edge of the central hole to maintain airtightness.

Advantageous Effects

In an opening and closing device for a side door for a device according to an embodiment of the present disclosure, because a worm gear connected to a drive motor has a reversible structure, an automatic mode and a manual mode may be implemented without a clutch device, and thus, the device may be simplified and costs may be reduced.

In an opening and closing device for a side door for a device according to an embodiment of the present disclosure, because a lead angle of a worm gear and a gear ratio of the worm gear and a worm wheel are optimized, an inclined state may be supported and automatic and manual modes may be implemented without a clutch device.

In an opening and closing device for a side door for a device according to an embodiment of the present disclosure, because a brake device is additionally provided, an inclined state may be more reliably supported.

BEST MODE

Mode for Invention

Figure 1:
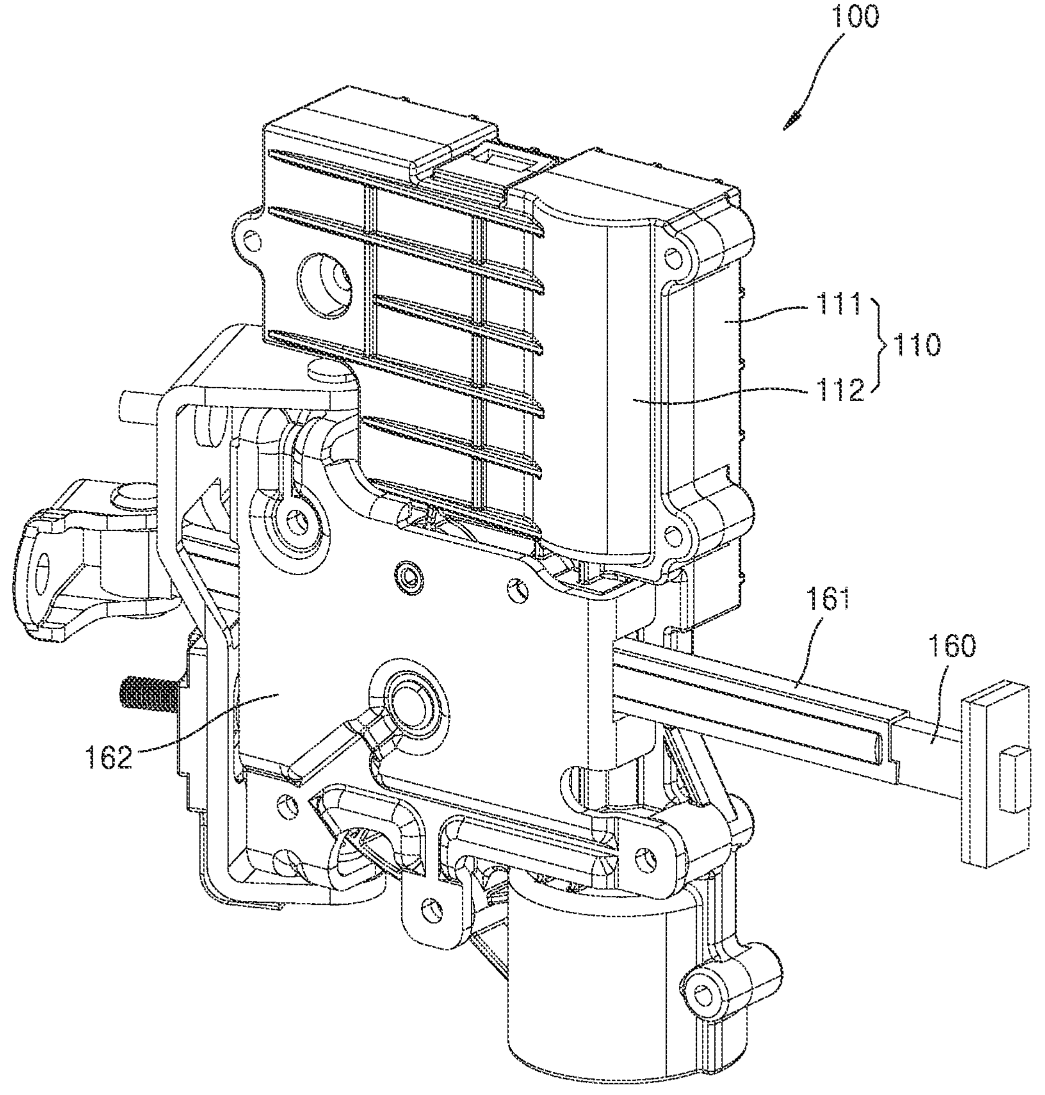
FIG. 1 is a front perspective view illustrating an opening and closing device for a side door for a vehicle, according to an embodiment of the present disclosure.
Figure 2:
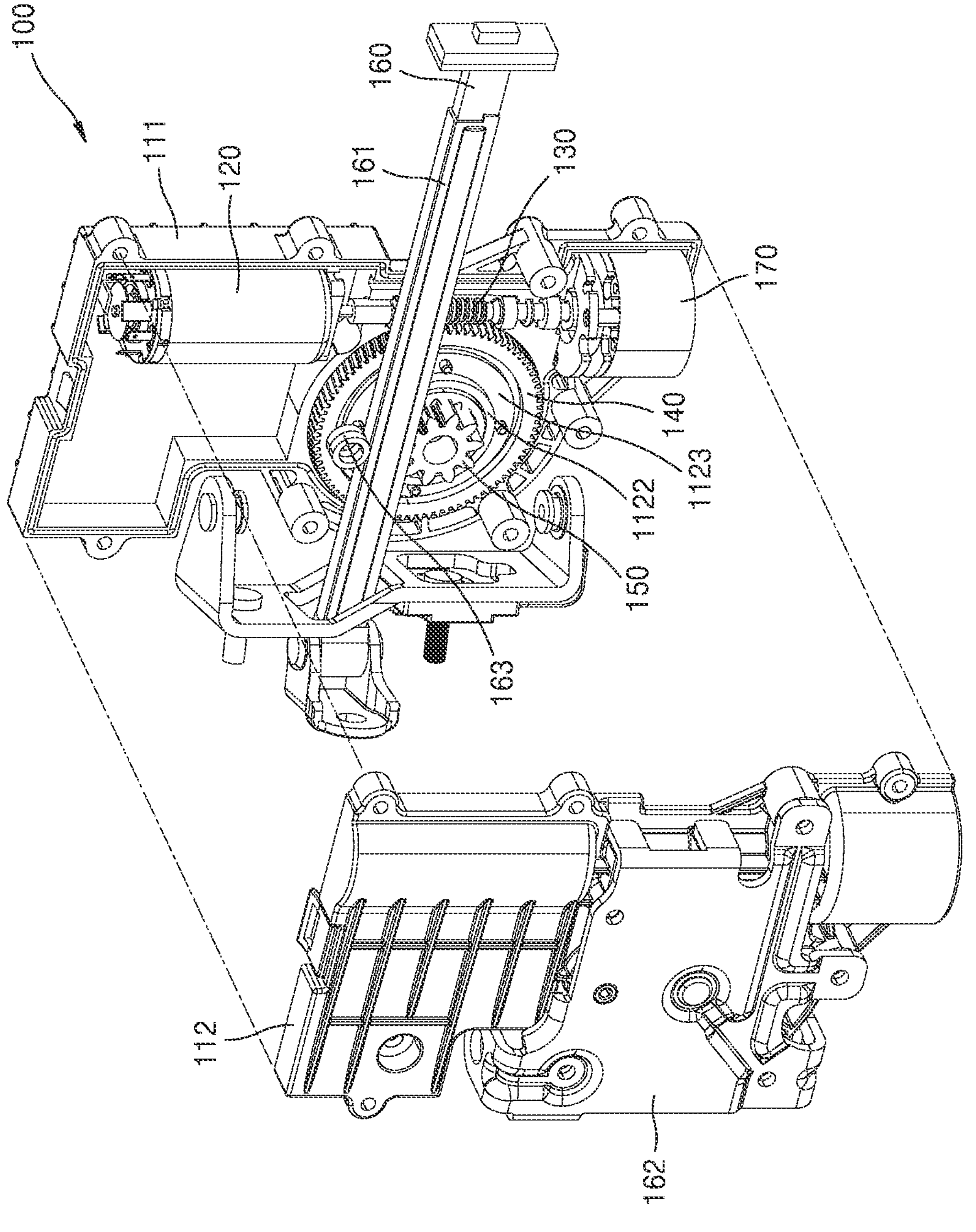
FIG. 2 is a partially exploded perspective view illustrating a state where a front cover of the opening and closing device of FIG. 1 is separated.
Figure 3:
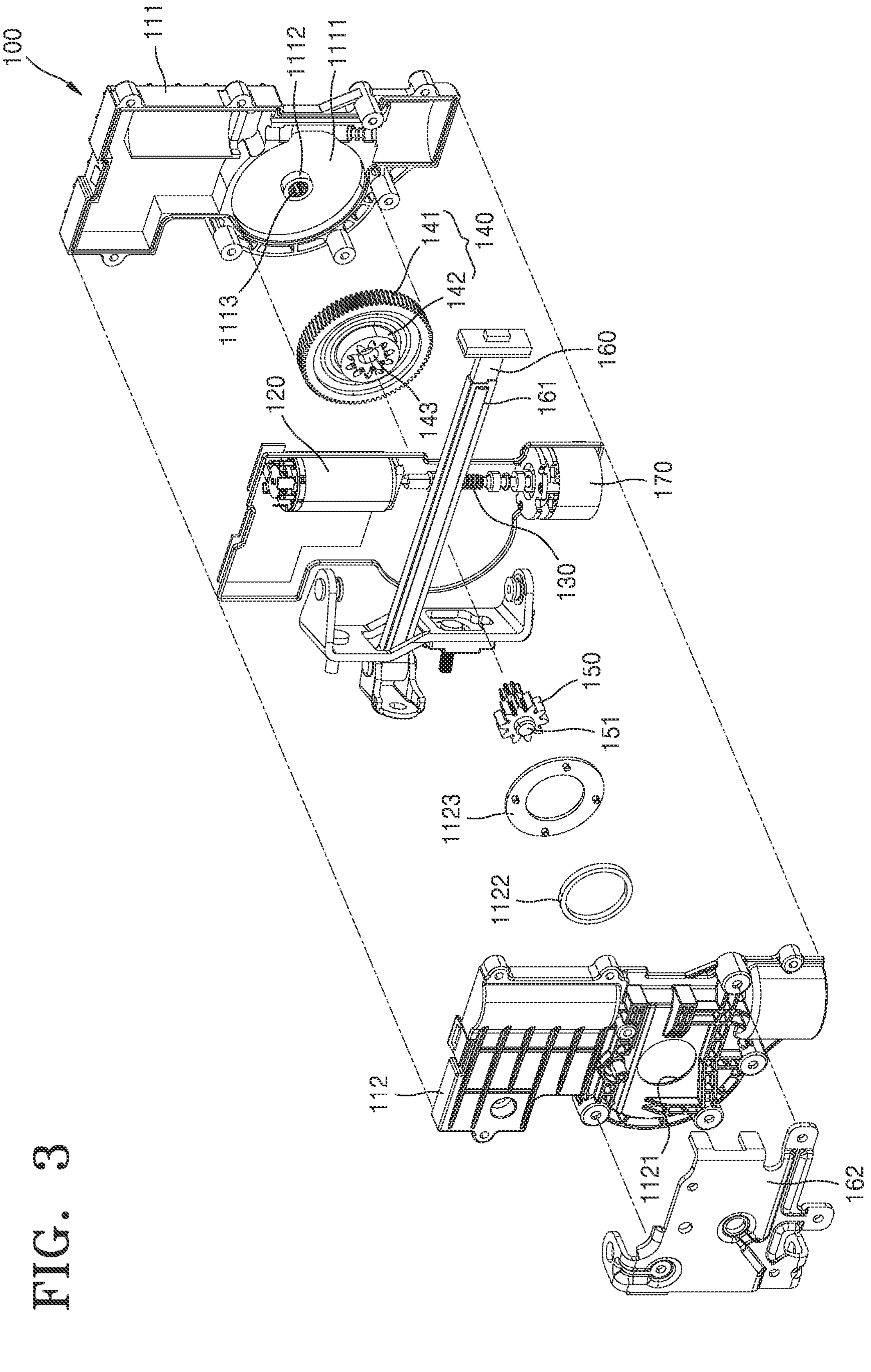
FIG. 3 is an exploded perspective view of FIG. 2.
Figure 4:
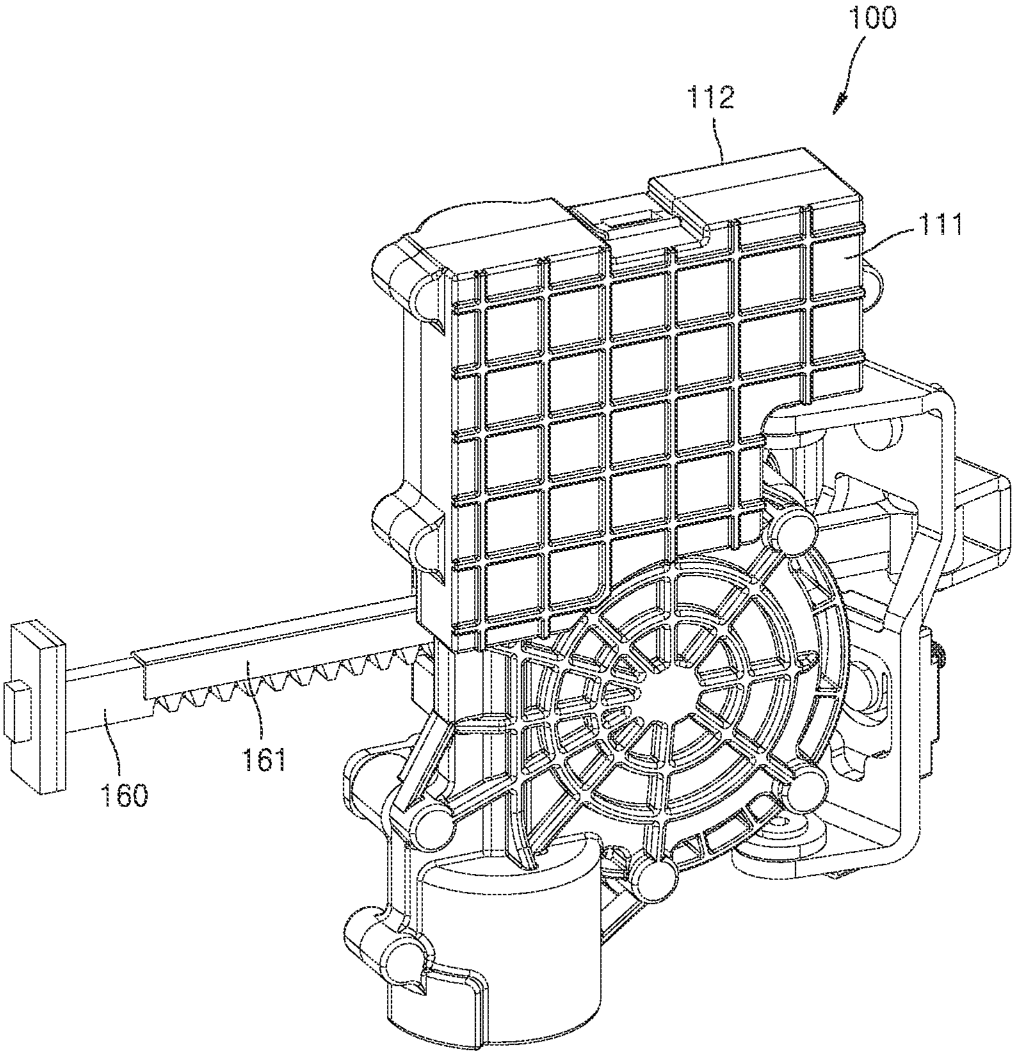
FIG. 4 is a rear perspective view illustrating the opening and closing device for a side door for a vehicle of FIG. 1.
Figure 5:
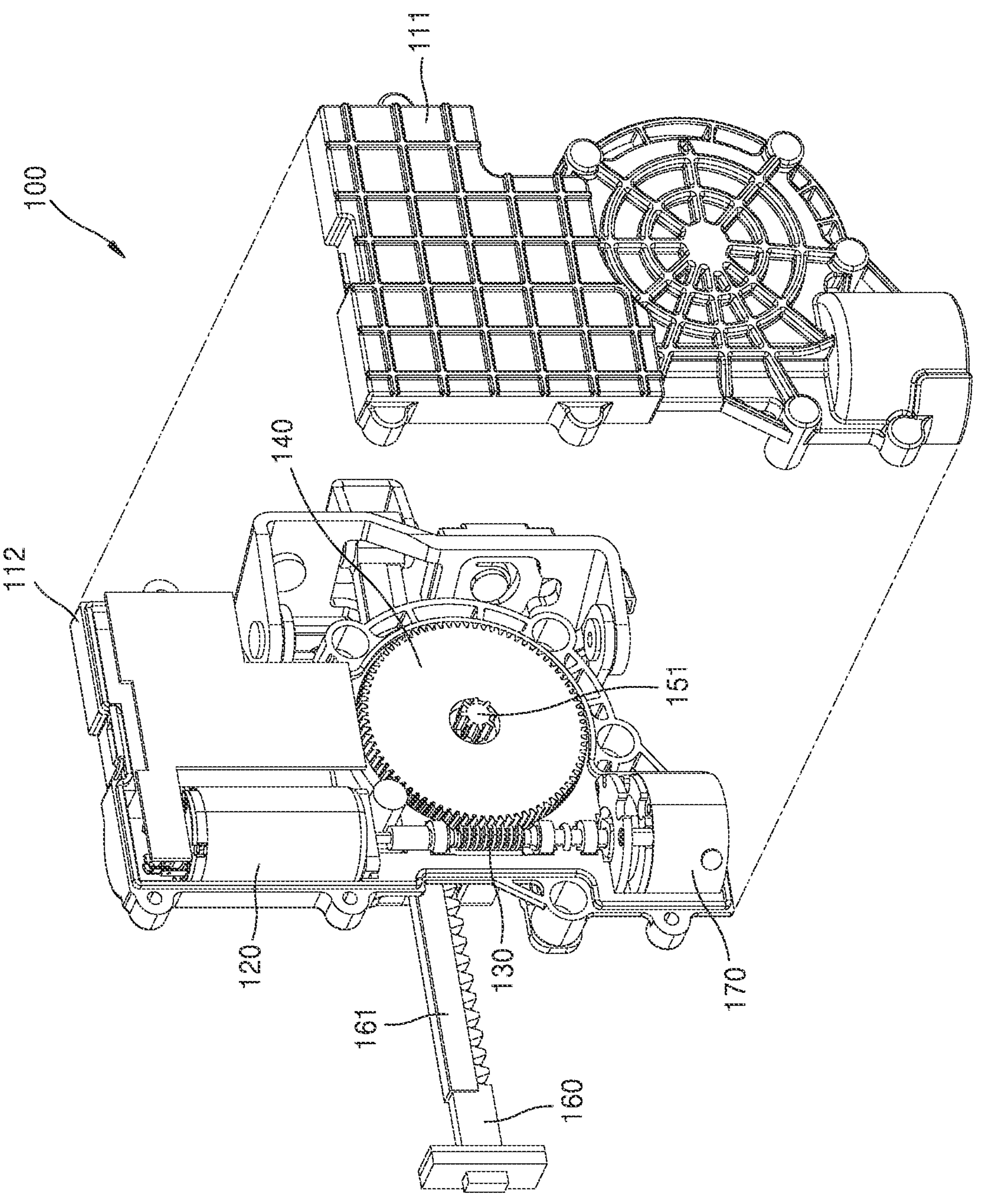
FIG. 5 is a partially exploded perspective view illustrating a state where a main body of the opening and closing device of FIG. 4 is separated.
Figure 6:
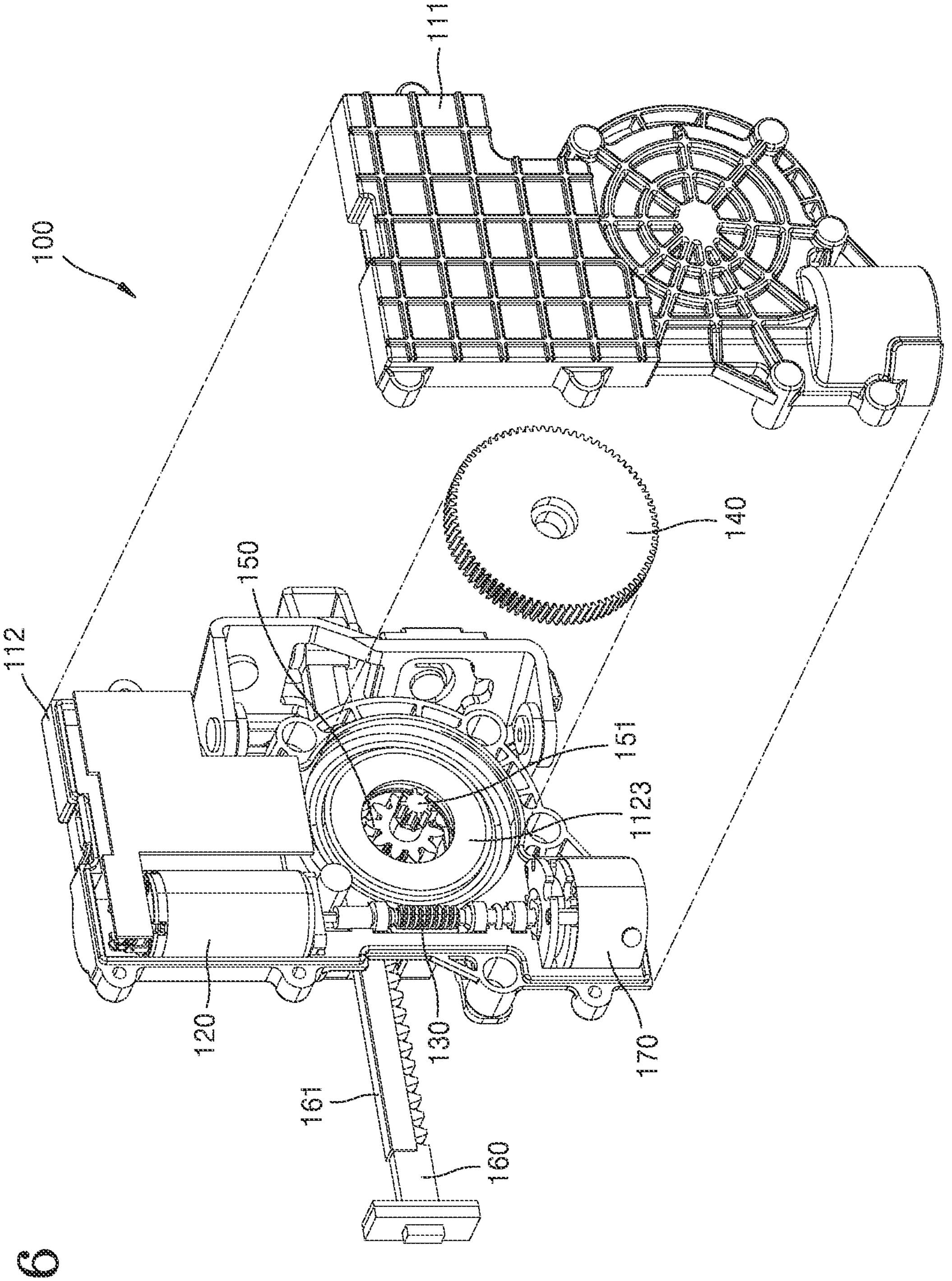
FIGS. 6 and 7 are exploded perspective views of FIG. 5.
Figure 7:
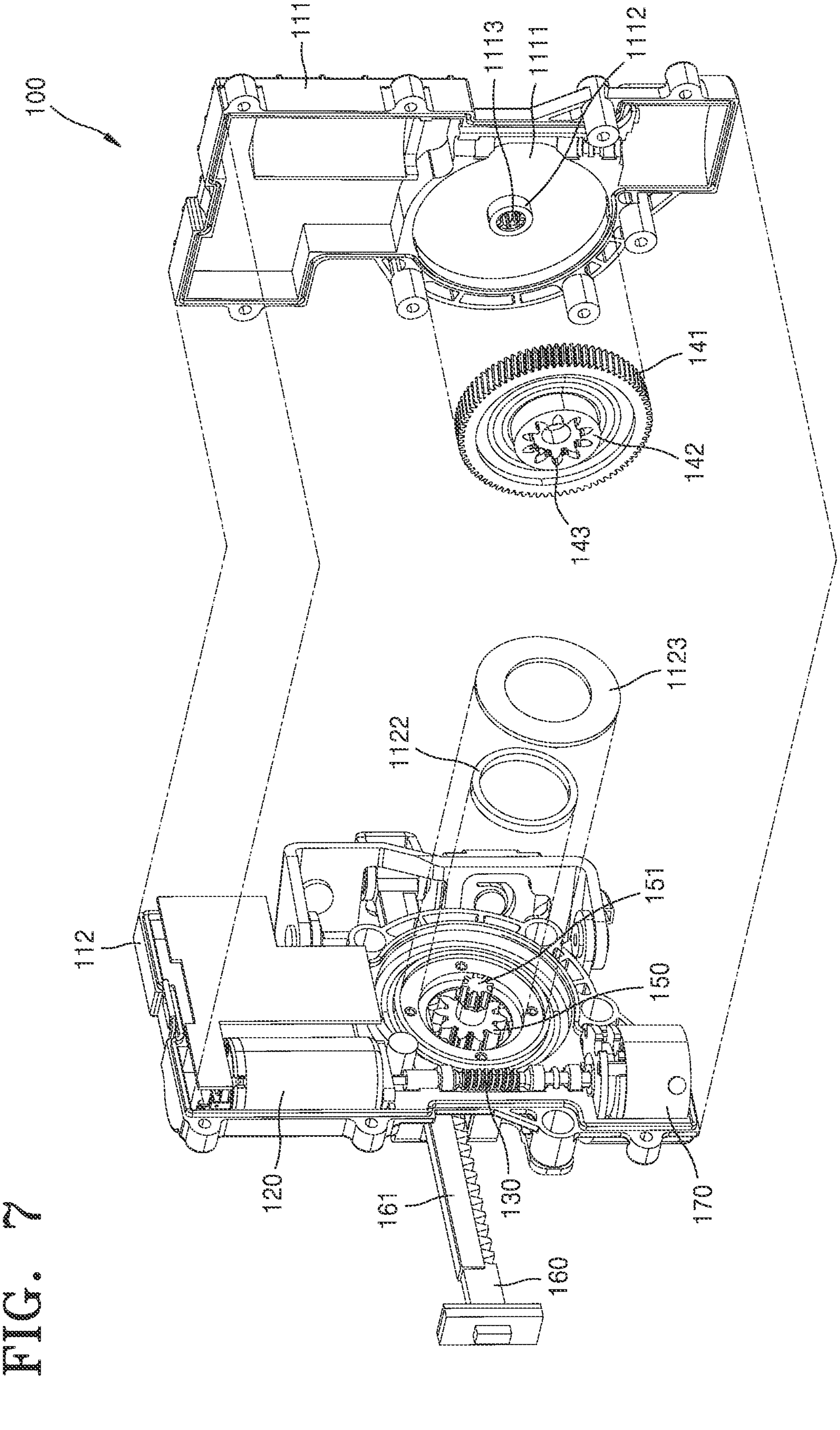
Figure 8:
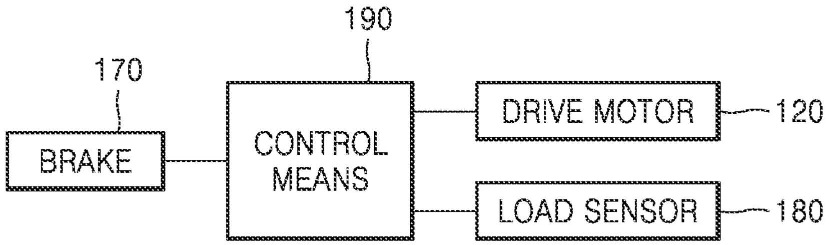
FIG. 8 is a block diagram illustrating a control system for an opening and closing device for a side door for a vehicle, according to an embodiment of the present disclosure.

Embodiments of the present disclosure are illustrated for the purpose of describing the technical concepts of the present disclosure. However, the scope of the present disclosure is not limited to the following embodiments or the detailed description of the embodiments.

Unless otherwise defined, all technical and scientific terms used herein have the same meaning as commonly understood by one of ordinary skill in the art to which this disclosure pertains. All terms used in the present disclosure are chosen for the purpose of more clearly describing the disclosure and are not to be construed as limiting the scope of the present disclosure.

The terms "comprising," "including," and "having," and the like used herein should be understood as open-ended terms connoting the possibility of inclusion of other embodiments, unless otherwise mentioned in a phrase or sentence including such terms.

A singular expression may include meanings of plurality, unless otherwise mentioned, and the same is applied to a singular expression stated in the claims.

When a certain component is described herein as "coupled to" or "connected to" another component, this should be understood as meaning that the certain component may be coupled or connected directly to the other component or that the certain component may be coupled or connected to the other component via a new intervening component.

An "upward" direction used herein is based on a direction in which a test socket is located with respect to a test board, and a "downward" direction refers to a direction opposite to the upward direction. It should be understood that a "vertical" direction used herein includes an upward direction and a downward direction, but does not refer to a specific one of the upward and downward directions.

Embodiments will be described with reference to examples shown in the accompanying drawings. In the accompanying drawings, the same or corresponding components are denoted by the same reference numerals. Also, in the description of the following embodiments, repeated descriptions of the same or corresponding components will be omitted. However, even when a description of such components is omitted, such components are not intended to be excluded in an embodiment.

Embodiments described below and examples illustrated in the accompanying drawings relate to an opening and closing device for a side door for a device, which is provided in the side door of the vehicle to automatically open and close the side door. The side door for the vehicle may be opened and closed by a drive motor, and may be manually opened and closed by a user when the drive motor does not operate.

An opening and closing device for a side door for a device according to an embodiment of the present disclosure will be described in detail with reference to the accompanying drawings.

An opening and closing device 100 of a side door for a vehicle of the present disclosure includes a housing 110, a drive motor 120, a worm gear 130, a worm wheel 140, a pinion gear 150, a rack gear 160, a brake 170, a load sensor 180, and a control means 190.

The housing 110 is provided in the side door of the vehicle. In detail, the housing 110 is located in a space between an outer panel and an inner panel of the side door. The housing 110 has a substantially quadrangular box shape, and has a receiving space therein. The housing 110 includes a main body 111 and a front cover 112. The main body 111 and the front cover 112 are coupled to each other by bolts to form the receiving space therebetween.

The drive motor 120 and various electronic components are provided in the receiving space of the housing 110, and a seal is provided between the main body 111 and the front cover 112 to prevent water from penetrating from the outside.

A central hole 1121 is formed at a substantially central portion of the front cover 112, and a central protrusion 142 of the worm wheel 140 is inserted into the central hole 1121. The pinion gear 150 and the worm wheel 140 receiving power from the drive motor 120 protrude from the central hole 1121, and the pinion gear 150 protruding from the central hole 1121 is engaged with the rack gear 160 that linearly moves outside the housing 110.

A sealing ring 1122 having a ring shape is formed around the central hole 1121 in the front cover 112 of the housing 110. The sealing ring 1122 serves to seal around the central hole 1121 and the central protrusion 142 of the worm wheel 140 to prevent rainwater or the like from flowing into the housing 110.

The sealing ring 1122 is formed in a ring shape and is forcibly fitted to an outer circumferential surface of the central protrusion 142 to prevent water from penetrating therebetween.

A pressing plate 1123 is formed around the sealing ring 1122 to contact the sealing ring 1122 and closely fix the sealing ring 1122 to the front cover 112. The pressing plate 1123 has a central hole with a shape corresponding to the central protrusion 142, and fixes the sealing ring 112 to the front cover 112 in a state where the sealing ring 1122 contacts one surface of the pressing plate 1123. A plurality of protrusions are provided on one surface of the pressing plate 1123 so that the pressing plate 1123 is non-rotatably fixed to the front cover 112 of the housing 110 and fixed to the front cover 112 by bolts (not shown).

A wheel receiving portion 1111 for accommodating the worm wheel 140 is formed on an inner surface of a central portion of the main body 111, and a shaft support 1112 into which a gear shaft 151 supporting the pinion gear 150 is non-rotatably inserted is provided at the center of the wheel receiving portion 1111.

In detail, a shaft insertion groove 1113 having a star shape while being recessed inward is formed in the shaft support 1112. Because an end of the gear shaft 151 of the pinion gear 150 has a star shape, when the gear shaft 151 is inserted into the shaft insertion groove 1113, the gear shaft 151 is non-rotatably fitted into the main body 111.

The drive motor 120 is located in the receiving space of the housing 110 and includes a drive shaft. The drive motor 120 is connected to the control means 190 and performs a rotational operation by receiving an electrical signal from the control means 190. The drive motor 120 is vertically provided on an upper portion of the housing 110, and the drive shaft is connected to the worm gear 130 that vertically extends in the housing 110. The drive motor 120 is well known, and thus, a detailed description thereof will be omitted.

One end of the worm gear 130 is connected to the drive motor 120 and the other end of the worm gear 130 is connected to the brake 170. In detail, the worm gear 130 is connected to the drive motor 120 and rotates by receiving a rotational force of the drive motor 120, and the brake 170 is connected to the other end of the worm gear 130 to prevent the door from being opened and closed in an environment unintended by a user.

In the present embodiment, a lead angle capable of reversing and supporting the door preferably ranges from 5° to 15°, and a gear ratio (worm gear:worm wheel) for reversing should be high, and preferably 1:80. The lower the gear ratio, the lower the reverse load, and the higher the gear ratio, the higher the reverse load.

As a result of a test, when a gear ratio is 1:40, a reverse load is too low to support a door inclined state. A gear ratio of 1:60 or more is required to reverse and support the door at the same time. An optimum value for each door should be selected by selecting a gear ratio and a lead angle. It is preferable that a gear ratio is as large as possible and a lead angle is also large. In the present embodiment, it is preferable that a lead angle ranges from 5° to 15° and a gear ratio (worm gear:worm wheel) ranges from 1:50 to 1:90.

However, when there is a limit in supporting an inclined state through optimization of a gear ratio and a lead angle, the brake 170 is applied to more reliably support the inclined state.

The worm wheel 140 may be engaged with the worm gear 130, and may rotate by receiving a rotational force of the worm gear 130. The worm wheel 140 is formed in a disk shape and has a plurality of gear teeth formed on an outer circumferential surface. The gear teeth of the outer circumferential surface mesh with gear teeth of the worm gear 130. The worm wheel 140 includes a wheel body 141 having the gear teeth formed at an circumferential edge, and the central protrusion 142.

One surface of the wheel body 141 is flat, and the central protrusion 142 protrudes from a central portion of the other surface of the wheel body 141. A concave groove 143 having a star shape corresponding to the pinion gear 150 is formed in the central protrusion 142, and a through-hole through which the gear shaft 151 supporting the pinion gear 150 passes is formed at the center of the central protrusion 142.

Because a part of the pinion gear 150 is inserted into the concave groove 143 formed in the central protrusion 142 of the wheel body 141, the pinion gear 150 interlocks and rotates when the wheel body 141 rotates, and the wheel body 141 interlocks and rotates when the pinion gear 150 rotates. Because the pinion gear 150 is inserted into the concave groove 143 integrally formed at the center of the wheel body 141, the wheel body 141 and the pinion gear 150 may simultaneously rotate without loss of a rotational force.

The pinion gear 150 rotates while being fitted around the gear shaft 151 that is non-rotatably fixed to the housing 110. In detail, the pinion gear 150 is rotatably supported on the gear shaft 151. With respect to the center of a thickness direction perpendicular to the central axis of the pinion gear 150, one side portion of the pinion gear 150 is engaged with the rack gear 160 and the other portion is inserted into the concave groove 143 of the wheel body 141.

Accordingly, when the worm wheel 140 rotates, the pinion gear 150 rotates, and thus, the rack gear 160 engaged with the pinion gear 150 linearly moves. Also, when the user manually operates the door, the rack gear 160 linearly moves, and thus, the pinion gear 150 rotates and the worm wheel 140 also rotates in conjunction with the pinion gear 150.

The rack gear 160 has one end hinged to a vehicle body, and is engaged with the pinion gear 150 to convert rotational motion of the pinon gear 150 into linear motion. The rack gear 160 is formed in a bar shape that linearly extends in one direction, and a plurality of gear teeth engaged with the gear teeth of the pinion gear 150 are formed on a bottom surface that extends in a longitudinal direction.

Because one end of the rack gear 160 is pivotably connected to the vehicle body, when the rack gear 160 linearly moves as the pinon gear 150 rotates, the door may rotate with respect to the vehicle body. A gear cover 161 having an open bottom while surrounding the rack gear 160 in the longitudinal direction is provided on the rack gear 160. A guide pin 163 pivotably connected to the housing 110 is provided over the gear cover 161 to guide a moving direction.

Also, a protective panel 162 fixed to the housing to form a space in which the rack gear moves is formed around the rack gear 160.

The brake 170 is located in the receiving space of the housing 110, and is connected to an end of the worm gear 130. The brake 170 is located opposite to the drive motor 120 with the worm gear 130 therebetween.

The brake 170 is operated by an electrical signal. The brake 170 uses a non-excitation method performed by an electrical signal in which a braking force is removed when an electrical signal is applied and a braking force is applied when an electrical signal is cut off. In detail, the brake 170 is operated by a spring force when an electrical signal is not supplied.

Because the brake 170 is applied, an inclined state supported by the worm wheel 140 having a reversible structure may be supplemented and thus, the door may be more reliably supported in the inclined state.

The load sensor 180 is configured to detect whether the user manually opens and closes the door. The load sensor 180 is provided on the rack gear 160, the housing 110, or another portion, to detect whether the user manually opens and closes the door. That is, when the user applies a force to the door to manually open and close the door, a load is applied to a hinge of the rack gear 160, the housing 110, the main body 111, etc., and the load sensor 180 detects the load.

Because the door may not be opened and closed when a braking force is applied to the brake 170 in a state where the vehicle stops and electricity is cut off, the load sensor 180 is configured to apply an electrical signal to the brake 170 when a load on the door is detected by the load sensor 180. Accordingly, a braking force of the brake 170 is removed, and the worm bear 130 may rotate.

The control means 190 is connected to each of the drive motor 120, the load sensor 180, and the brake 170, to control each of the drive motor 120, the load sensor 180, and the brake 170.

In detail, when the door is automatically opened and closed, the control means 190 controls an electrical signal to be applied to the drive motor 120 to rotate the drive motor 120.

Also, because the control means 190 is connected to the brake 170, when the vehicle is turned off, the control means 190 controls a signal provided to the brake 170 to be removed so that the door is not opened and closed in an inclined state.

Also, because the control means 190 is connected to the load sensor 180, when a load of the user on the door of the vehicle is detected and it is determined that the load is for an opening and closing operation, the control means 190 controls an electrical signal to be applied to the brake 170, to remove a braking force of the brake 170. Accordingly, when the user tries to manually rotate the door in the manual mode, the worm gear 130 may be rotated by the worm wheel 140 that is rotating.

Effects according to an embodiment of the present disclosure are as follows.

According to an embodiment, the worm gear 130 has a structure capable of reversing and supporting the door in an inclined state by adjusting a lead angle of the worm gear 130. That is, in the automatic mode, the drive motor 120 receiving an electrical signal may be operated by the control means 190, and the worm gear 130, the worm wheel 140, the pinion gear 150, and the rack gear 160 may accordingly operate to open and close the door.

Also, when the user applies a force to open and close the door, the drive motor 120 is rotated through the rack gear 160, the pinion gear 150, the worm wheel 140, and the worm gear 130. Although a structure in which the worm gear 130 is not rotated by the worm wheel 140 has been adopted, the present disclosure adopts a reversible structure, and thus, the drive motor may reversibly rotate by adjusted a gear ratio and the door may be supported without rotating even in an inclined state.

Also, the brake 170 is additionally applied in case the door is not supported in the inclined state. The brake 170 is provided in consideration of a case where the worm gear 130 has a reversible structure and is difficult to support in the inclined state. Also, the load sensor 180 is provided to remove a braking force of the brake 170 when the user opens and closes the door by adding the load sensor 180, considering that when power is supplied to the brake 170 in the manual mode, a braking force is generated and the worm gear 130 does not rotate.

In the opening and closing device according to an embodiment of the present disclosure, because a clutch device is not applied, an overall structure may be simplified, manufacturing costs may be reduced, and the risk of failure may be reduced.

However, the opening and closing device of the side door for the vehicle of the present disclosure is not limited thereto, and may be modified as follows.

Although the brake is added in the above embodiments, the present disclosure is not limited thereto, and a lead angle of the worm gear and a gear ratio may be changed differently from before without applying the brake.

Also, although the non-excitation operative brake in which a braking force is removed when an electrical signal is supplied is applied in the above embodiments, the present disclosure is not limited thereto, and various brakes may be applied.

Although the opening and closing device of the side door for the vehicle of the present disclosure has been described, the scope of the present disclosure is not limited thereto, and various modifications may be made within the scope of the present disclosure.

The invention claimed is:

1. An opening and closing device for a side door configured to enable a door of a vehicle to be automatically opened and closed with respect to a vehicle body, the opening and closing device comprising:

a housing configured to be fixedly disposed in the door and having a receiving space therein;

a drive motor disposed in the receiving space of the housing and comprising a drive shaft;

a worm gear connected to the drive shaft and configured to rotate together with the drive shaft;

a worm wheel configured to engage with the worm gear and rotatable by receiving a rotational force from the worm gear;

a pinion gear configured to rotate in conjunction with the worm wheel; and a rack gear having one end configured to be hinged to the vehicle body, the rack gear being configured to be engaged with the pinion gear to convert rotational motion of the pinion gear into linear motion, wherein the worm gear has a reversible structure, wherein the worm gear is rotatable by receiving a rotational force of the worm wheel when the worm wheel rotates, so that, when the drive motor rotates in an automatic mode, the worm gear is configured to rotate the worm wheel, and when a user manually rotates the door in a manual mode, the worm gear is rotatable by the rotating worm wheel, wherein the drive motor is connected to one end of the worm gear, and a brake configured to stop rotation of the worm gear is disposed at another end of the worm gear, and wherein the brake is configured to remove a braking force when an electrical signal is applied to the brake and to apply the braking force when the electrical signal is removed from the brake.

2. The opening and closing device of claim 1, wherein a lead angle of a thread of the worm gear ranges from 5° to 15°.

3. The opening and closing device of claim 1, further comprising a load sensor configured to detect a manual opening or closing of the door by the user; and a controller connected to the load sensor and configured to transmit the electrical signal to the brake when the load sensor detects the manual opening or closing of the door by the user, wherein, when the load sensor detects that the user manually opens or closes the door in the manual mode, the controller connected to the load sensor is configured to apply the electrical signal to the brake to remove the braking force.

4. The opening and closing device of claim 1, wherein a concave groove having a shape corresponding to the pinion gear is defined at a center of the worm wheel, and a part of the pinion gear is disposed in the concave groove so that the pinion gear is configured to rotate in conjunction with the worm wheel, and a gear shaft supporting the pinion gear is disposed in a center of the pinion gear while being rotationally fixed to the housing.

5. The opening and closing device of claim 4, wherein the worm wheel comprises a wheel body having gear teeth disposed at a circumferential edge of the wheel body, and a central protrusion protruding from one surface of the wheel body, the central protrusion having the concave groove defined at a center of the central protrusion, and wherein a central hole is defined in the housing at a position corresponding to the central protrusion, and a sealing ring is fixedly disposed at a circumferential edge of the central hole to maintain airtightness.

* * * * *